United States Patent Office 2,887,779
Patented May 26, 1959

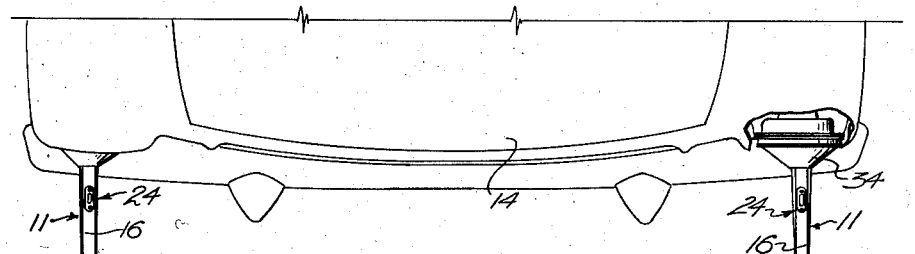
*Fig. 1.*
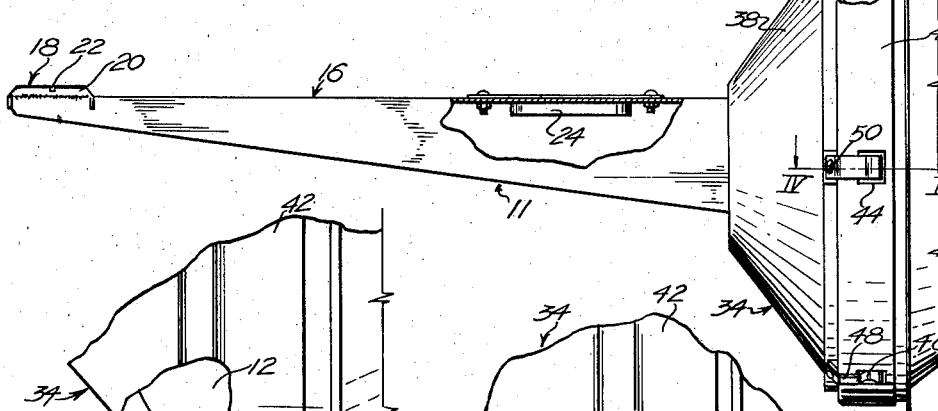
*Fig. 2.*
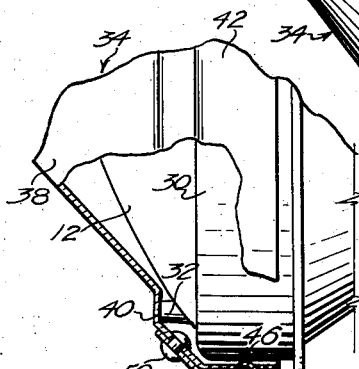
*Fig. 3.* *Fig. 4.*
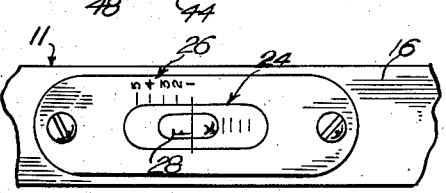
*Fig. 6.*
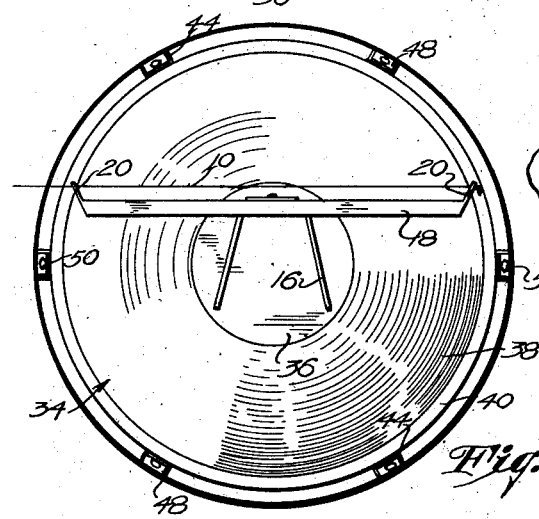
*Fig. 5.*
INVENTOR.
Norval K. Hearn
BY
ATTORNEY

2,887,779
AUTOMOBILE HEADLIGHT ADJUSTER

Norval K. Hearn, Emporia, Kans.

Application May 14, 1956, Serial No. 584,773

4 Claims. (Cl. 33—180)

This invention relates to an automobile headlight adjuster, and has for its primary object to improve upon the disclosures of my co-pending applications Serial No. 464,974 filed October 27, 1954, now Patent No. 2,767,480, issued October 23, 1956; and Serial No. 560,524 filed January 23, 1956, this being a continuation-in-part of said co-pending applications.

It is the most important object of the present invention to provide improved means for mounting an adjuster upon an automobile headlamp and particularly upon the retaining ring of the headlamp so that the adjuster may be readily shifted with respect to such ring while remaining in frictional engagement therewith.

It is another important object of the present invention to provide a novel support forming a part of an automobile headlamp adjuster that includes a plurality of elements which frictionally engage the retaining ring of the headlamp when the support is mounted thereon, permitting, therefore, not only rotational movement of the adjuster with respect to the headlamp, but tipping movement of the adjuster during the steps that are taken in the procedure of providing proper adjustment for both headlamps of the automobile.

A further important object of the instant invention is the provision of a support for an adjuster of the aforementioned character that includes a plurality of resilient elements such as spring clips for engaging the retaining ring and which clips are yieldable outwardly in a radial direction with respect to the ring, all for the purpose of conforming to irregularities in the ring, permitting rotational and tipping adjustment of the support with respect to the headlamp, and facilitating rapid attachment and removal of the adjuster without necessity of tightening and loosening clamp or otherwise manipulating any part of the adjuster.

A still further important object of the present invention is the provision of a novel support of the aforementioned character that is provided with stop means as a part thereof engageable with forwardly projecting studs on the headlamp and cooperable with the said resilient element in quickly permitting proper positioning of the adjuster on the headlamp.

In the drawing:

Figure 1 is a fragmentary plan view of the forwardmost end of a conventional automobile illustrating a pair of headlight adjusters made pursuant to the present invention, operably mounted on the retaining rings of the headlights;

Fig. 2 is an enlarged, side-elevational view of one of the adjusters, parts being broken away and in section to reveal details of construction;

Fig. 3 is an enlarged, fragmentary, side-elevational view similar to Fig. 2, parts being broken away and in section for clearness;

Fig. 4 is a view similar to Fig. 3, but showing one of the retaining clips of the support;

Fig. 5 is an enlarged, rearwardmost end view of the adjuster shown in Fig. 2; and Fig. 6 is an enlarged, fragmentary, plan view showing the spirit level that is mounted on the forwardly extending arm of the adjuster.

As in the adjusters forming the subject matter of my co-pending applications aforementioned, the adjusting principle contemplated by the structure about to be described includes the utilization of a cord 10, extended across a pair of adjusters 11, one for each headlamp 12 of automobile 14. The adjusters 11 are each provided with a forwardly extending, substantially horizontal arm 16 that are in turn provided with cross elements 18 at the outermost free ends thereof. Elements 18 are each provided with a pair of opposed, upstanding flanges 20 having notches 22 for receiving the cord 10 when the latter is held taut in any suitable manner and whenever the lamps 12 are properly adjusted to place the arms 16 in substantial parallelism. Vertical adjustment is attained by utilization of spirit levels 24 carried by the arms 16 and disposed adjacent suitable indicia 26 whereby the user may set the adjustment of the lamps 12 whenever bulb 28 is aligned with the desired indicia 26.

The sealed beam headlamps 12 are of conventional character and provided with adjusting means (not shown) which is readily accessible to the user of the equipment while the two adjusters 11 are mounted in place through use of the structure about to be described. In this respect, it is to be pointed out that the usual decorative rims are removed prior to mounting the adjusters 11 on the headlamps 12 and that the lamps 12 are provided with annular retaining rings 30 together with a plurality of forwardly extending guide studs 32 which are included by the manufacturers of the lamps 12 for the purpose of facilitating adjustment in the field.

The arms 16 are mounted on a frusto-conical support broadly designated by the numeral 34 which is hollow and provided with a flat circular plate 36 closing the apex end thereof and to which the innermost ends of the arms 16 are rigidly attached by welding or otherwise.

The frusto-conical wall 38 of support 34 is offset intermediate the ends thereof to provide a flat annular flange 40 which engages the outermost ends of the studs 32 when the support 34 is mounted on the ring 30 as best seen in Fig. 3 of the drawing.

The innermost open base end of the support 34 is defined by an annular band 42 which circumscribes the ring 30 and, inasmuch as the band 42 itself is not utilized alone to hold the support 34 in place on the ring 30, it is to be preferred that the inside diameter of the band 42 be sufficiently greater than the outside diameter of the ring 30 to permit the band 42 to be easily and quickly slipped into place in surrounding relationship to the ring 30.

An annular series of openings 44 is provided in the band 42 for receiving a corresponding number of offsets or feet 46 which frictionally engage the ring 30 when the support 34 is mounted on the units 12.

It is to be preferred that the elements 46 which engage the ring 30 be biased against the latter, yet be readily yieldable outwardly in a radial direction with respect to the ring 30 and therefore the elements 46 form a part of resilient devices 48 in the nature of leaf springs or spring clips that are attached directly to the wall 38 of support 34 adjacent the band 42 by rivets or other fasteners 50.

It is, therefore, seen that all of the resilient elements 48 which yieldably engage the ring 30 which they surround adequately hold the support 34 in place with respect to the lamp 12 during the adjusting operations initially described herein. The flange member 40 engaging the studs 32 assists the operator in properly positioning the support 34 on the headlamp 12 and does not interfere with any tipping action or rotation of the support 34 that may be desired or become necessary during the adjusting procedure. In this respect, it is seen that the spring clips 48 will conform to the shape and contour of the ring 30, readily yield during any tipping movement of the band 42 with respect to the ring 30, and permit rotation of the band 42 notwithstanding any irregularities that may appear in the surface of the ring 30. Furthermore, the support 34 may be easily and quickly slipped into place and removed without the necessity of manipulating any clamps or other fastening devices commonly employed in this field.

Having thus described the invention, what is claimed as new and desired to be secured by Letters Patent is:

1. A support for mounting an adjuster upon an automobile headlamp having a retaining ring, said support comprising a frusto-conical wall; an annular band integral with one edge of said wall, said band being adapted to surround said ring when the support is mounted upon the headlamp, said band being provided with a plurality of openings; and a leaf spring clip mounted on said wall adjacent each opening respectively, each clip having an offset foot extending through its corresponding opening and adapted to engage said ring whereby to hold the support in place upon the headlamp.

2. A support for mounting an adjuster upon an automobile headlamp having a retaining ring, said support comprising a frusto-conical wall; means for mounting an adjuster on the apex end thereof; an annular band formed at the base end of said wall and adapted to surround said ring when the support is mounted upon the headlamp, said band being provided with a plurality of openings; and a leaf spring clip mounted on said wall adjacent each opening respectively, each clip having an offset, ring-engaging foot, the feet extending through their corresponding openings, the clips being arranged in an annular series surrounding the band.

3. A support for mounting an adjuster upon an automobile headlamp having a retaining ring and a plurality of forwardly extending studs, said support comprising a frusto-conical wall; means for mounting an adjuster on the apex end thereof; an annular band formed at the base end of said wall and adapted to surround said ring when the support is mounted upon the headlamp, said band being provided with a plurality of openings; and a leaf spring clip mounted on said wall adjacent each opening respectively, each clip having an offset ring-engaging foot, the feet extending through their corresponding openings, the clips being arranged in an annular series surrounding the band, said wall being provided with an annular, stud-engaging flange intermediate the ends thereof.

4. A support for mounting an adjuster upon an automobile headlamp having a retaining ring and a plurality of forwardly extending studs, said support comprising a frusto-conical wall; an adjuster-receiving plate secured to the apex end thereof; a cylindrical band integral with the opposite, base end of said wall, said band being adapted to surround said ring in spaced relationship therefrom when the support is mounted upon the headlamp, said band being provided with a plurality of openings; a leaf spring clip mounted on said wall adjacent each opening respectively, each clip having an offset, ring-engaging foot extending through its corresponding opening and each being adapted to yield radially, outwardly with respect to the ring as the band is rotated or tipped relative to the ring; and an annular stud-engaging flange formed intermediate the ends of said wall.

References Cited in the file of this patent

UNITED STATES PATENTS

| | | |
|---|---|---|
| 1,738,990 | Dunkelsberg | Dec. 10, 1929 |
| 2,557,893 | Russell et al. | June 19, 1951 |
| 2,609,611 | Dickson | Sept. 9, 1952 |
| 2,797,494 | Irwin | July 2, 1957 |